3,158,606
METHOD OF RECOVERING SAPONINS AND SAPO-
GENINS FROM FERMENTED PLANT JUICE
Ernst Wenzler, Bochingen, and Karl Zeile and Karl Heinz
Hauptmann, Ingelheim, Germany, assignors, by mesne
assignments, to Boehringer Ingelheim G.m.b.H., Ingel-
heim (Rhine), Germany, a corporation of Germany
No Drawing. Filed Nov. 19, 1962, Ser. No. 238,715
7 Claims. (Cl. 260—239.55)

This invention relates to a novel method of recovering saponins and sapogenins from fermented plant juices.

More particularly, the present invention relates to a novel method of separating the water-insoluble glycosides formed during fermentation of the press juice of sisal agaves from the associated liquid phase.

It is well known that as an increment of the process of recovering hecogenin from the press juice of sisal agaves, the juice is allowed to ferment, whereby the water-soluble glycosides contained in the juice undergo a partial decomposition or degradation in the carbohydrate moiety to form water-insoluble glycosides (saponins). These water-insoluble glycosides separate out in the form of finely divided suspended matter. The separation of the suspended matter from the liquid phase presents considerable difficulties.

Various methods have been described in the prior art which were designed to facilitate the separation of the suspended matter from the associated liquid. In general, these methods involve allowing the fermented juice to stand for 1–2 days, whereby the suspended matter settles as a sediment or sludge in the bottom portion of the liquid. The supernatant clear liquid (about ⅓ to ½ of the total volume) may then be separated from the sludge below by decantation, for instance. The sludge is then subjected to various treatments with mineral acids or bases at elevated temperatures to transform it into a mass which can be more easily filtered or centrifuged to remove excess liquid. After filtration or centrifuging, the moist mass is dried before being shipped to a chemical plant for extraction of hecogenin.

All of these previously suggested methods, however, have substantial drawbacks. One of these is that they necessitate the use of various types of apparatus which are difficult to obtain at locations where sisal is processed. Moreover, the previously described methods invariably involve the use of chemicals, which render the processing of said sisal juice expensive because of the poor transportation facilities in and around the areas where sisal agave is grown. Finally, the handling of chemicals of the nature required by these methods involves a considerable amount of danger to the unskilled native labor force.

It is an object of the present invention to provide a method of effectively separating the suspended, water-insoluble glycosides in fermented sisal juice from the associated liquid, which method can be performed with readily available equipment of simple design.

Another object of the present invention is to provide a method of converting the suspended, water-insoluble glycosides in fermented sisal juice into a concentrated sludge which does not need to be treated with chemicals and filtered or centrifuged prior to drying.

Other objects and advantages of the invention will become apparent as the description thereof proceeds.

We have discovered that the above objects and advantages are achieved by subjecting the suspended matter in the fermented sisal juice to a floatation treatment with air.

More particularly, the floatation treatment according to the present invention comprises introducing a vigorous stream of air at the bottom of the vessel containing the fermented sisal juice, whereby a kind of emulsion is formed. Upon standing, this emulsion clarifies and all of the suspended glycosides collect at the surface of the clear liquid as a foamy mass. The clear liquid (about ⅓ of the volume of the original fermented juice) is siphoned off or drained off.

This floatation treatment may, if desired, be combined with the customary sedimentation process, that is, by allowing the suspended matter in the fermented juice to settle out at the bottom, decanting or siphoning off the supernatant liquid, and applying the floatation treatment to the sediment remaining in the fermentation vessel.

The sludge-like mass obtained from the floatation treatment described above may then be admixed with water and the floatation treatment may be repeated. The floatation product obtained thereby is a substantially purified, highly concentrated glycoside product. The floatation separation of glycosides takes place more and more readily as more of the original liquid, which contains a number of soluble plant substances, such as pectins, sugar, proteins, and the like, is replaced with clean water. The floatation action may be enhanced by the addition of suitable floatation agents and/or wetting agents.

The floatation product obtained by the process according to the present invention has a solids content of about 5–10% by weight, and may in this form be subjected to the customary treatments, that is, drying, hydrolysis to convert the saponins into sapogenins and extraction of the desired sapogenin, notably hecogenin.

A particular advantage of the process according to the present invention is that the partially decomposed or degraded glycosides obtained thereby are of a high degree of purity; thus, the dried floatation product has an ultimate sapogenin content of 10–15%, whereas the dried sedimentation product obtained by the prior art methods contains such a high percentage of impurities that its ultimate sapogenin content is only about 4–7%. In other words, the recoverable yield of sapogenin subsequent to hydrolysis is about doubled by applying the floatation treatment pursuant to the present invention.

The floatation product thus obtained is then dried. Especially advantageous properties, from the viewpoint of the subsequent treatments applied to it, are imparted to the dry floatation product if the drying step is accompanied or followed by a heat treatment at 80–150° C., preferably 100–120° C., for 6 to 15 hours. The material thus treated proves to be especially favorable during the subsequent customary operations, that is, hydrolysis to form hecogenin and purification of the raw hecogenin, because the entrained impurities are altered in such a manner by the heat treatment that their separability is substantially facilitated and the crystallizability and filterability of the pure hecogenin are considerably improved.

The following example further illustrates the present invention and will enable others skilled in the art to understand the invention more completely. It should be understood, however, that our invention is not limited to the specific conditions recited in this illustrative example.

*Example*

48 cubic meters of sisal press juice, obtained from sisal agave leaves of the 4th and 5th harvest years, were allowed to ferment over a period of four days. The fermented juice had separated into a sediment and a supernatant, substantially clear liquid phase. The liquid phase was siphoned off, so that about 13 cubic meters of sediment phase remained in the fermentation vat. The cloudy sediment phase was pumped into a vertical tank, and air was blown through the sediment phase for 2 hours through a jet pipe having its outlet end located at the bottom of the tank. After only a few minutes of blowing, the suspended solids began to collect at the surface of the liquid. The flow of air was shut off after two hours, and the contents of the tank were allowed to stand. Thereafter, about 4 cubic meters of clear liquid were drained off from the bottom. The creamy residue was again subjected to the flotation treatment by passing air therethrough from the bottom for 1–2 hours by means of the jet pipe. Thereafter, the contents of the tank were again allowed to stand for 24 hours, and 2 cubic meters of clear liquid were drained off from the bottom.

A thick slurry having volume of about 5–6 cubic meters remained behind. This slurry was removed from the tank and was spread in layers of 2–3 cm. thickness on the screen trays of a dryer with circulating hot air flow. After about 2 days of drying at an air temperature of 105–110° C. a solid, grainy mass was obtained, which had a moisture content of 3.5% by weight and weighed 216 kg.

The dried mass was subjected to acid hydrolysis, and the hydrolized product was treated with milk of lime and then diced, all in conventional fashion. Extraction of the dry hydrolysis product with the customary extraction solvents yielded 28.2 kg. of hecogenin acetate having a melting point of 236–238° C.

While the invention has been illustrated with the aid of a specific embodiment, it will be readily apparent to others skilled in the art that the invention is not limited to this particular embodiment and that various changes and modifications may be made without departing from the spirit of the invention or the scope of the appended claims.

We claim:

1. In a process for recovering hecogenin from an aqueous slurry obtained by autolysis of heconin-containing sisal agave sap, said slurry consisting essentially of insoluble solids and an aqueous liquid, which comprises the steps of separating the insoluble solids from the aqueous liquid, drying the separated solids, subjecting the dried solids to acid hydrolysis and extracting hecogenin from the hydrolyzed product, the improvement which comprises effecting the separation of the insoluble solids in the aqueous slurry from the aqueous liquid by floatation, said floatation consisting essentially of passing a stream of air upwardly through the aqueous slurry, whereby the insoluble solids are caused to float on the surface of the aqeous liquid, and removing the aqueous liquid from below the floating insoluble solids, prior to drying the separated solids.

2. The improved process according to claim 1, wherein the floatation is repeated at least once.

3. The improved process according to claim 1, wherein the floatation is repeated at least once with intervening addition of water to the separated insoluble solids.

4. The improved process according to claim 1, wherein the floatation is performed in the presence of a floatation agent.

5. The improved process according to claim 1, wherein the floatation is performed in the presence of a wetting agent.

6. In a process for recovering hecogenin from an aqueous slurry obtained by autolysis of heconin-containing sisal agave sap, said slurry consisting essentially of insoluble solids and an aqueous liquid, which comprises the steps of separating the insoluble solids from the aqueous liquid, drying the separated solids, subjecting the dried solids to acid hydrolysis and extracting hecogenin from the hydrolyzed product, the improvement which comprises effecting the separation of the insoluble solids in the aqueous slurry from the aqueous liquid by floatation, said floatation consisting essentially of passing a stream of air upwardly through the aqueous slurry, whereby the insoluble solids are caused to float on the surface of the aqueous liquid, removing the aqueous liquid from below the floating insoluble solids, and drying the separated insoluble solids at a temperature of 80–150° C., prior to subjecting the dried solids to acid hydrolysis.

7. In a process of recovering hecogenin from an aqueous slurry obtained by autolysis of heconin-containing sisal agave sap, said slurry consisting essentially of insoluble solids and an aqueous liquid, which comprises the steps of eparating the insoluble solids from the aqueous liquid, drying the separated solids, subjecting the dried solids to acid hydrolysis and extracting hecogenin from the hydrolyzed product, the improvement which comprises effecting the separation of the insoluble solids in the aqueous slurry from the aqueous liquid by floatation, said floatation consisting essentially of passing a stream of air upwardly through the aqueous slurry, whereby the insoluble solids are caused to float on the surface of the aqueous liquid, removing the aqueous liquid from below the floating insoluble solids, drying the separated insoluble solids and heating the dried solids at a temperature of 80–150° C., prior to subjecting the dried solids to acid hydrolysis.

References Cited in the file of this patent

UNITED STATES PATENTS 2,989,525  Wilkins et al. _____ June 20, 1961